Aug. 10, 1954

H. E. HELSER 2,686,076

CONVERTIBLE AUTOMOBILE BODY

Filed Sept. 6, 1952

INVENTOR.
HARRY E. HELSER

BY

Cubett, Mahony + Miller

ATTORNEYS

Aug. 10, 1954  H. E. HELSER  2,686,076
CONVERTIBLE AUTOMOBILE BODY
Filed Sept. 6, 1952  2 Sheets-Sheet 2

INVENTOR.
HARRY E. HELSER
BY
*Corbett, Mahoney + Miller*
ATTORNEYS

Patented Aug. 10, 1954

2,686,076

UNITED STATES PATENT OFFICE 2,686,076

CONVERTIBLE AUTOMOBILE BODY

Harry E. Helser, Zanesville, Ohio

Application September 6, 1952, Serial No. 308,261

12 Claims. (Cl. 296—63)

My invention relates to a convertible automobile body. It has to do, more particularly, with an automobile body of the open two-seat or touring type which can be converted to a body of the one seat or sports roadster type.

At present, there is manufactured a two-seat open type car body, the rear seat being fairly close to the front seat. These bodies are called "roadsters" or "convertibles" but are more similar to the old-fashioned touring car since they have two seats. The rear seat is a convenience but detracts from the "sporty" or streamlined appearance of the body especially when the top is not in place.

In order to give the body a more streamlined and "sporty" appearance when the rear seat is not being used, I provide means for covering the space occupied by the rear seat to provide a continuous surface sweeping from just behind the front seat to the rear of the car.

To cover the space occupied by the rear seat when desired, I provide a sliding panel or lid associated with such space. This panel is so mounted that it can be moved easily to an out-of-the-way position in the rear trunk of the car where it will not be seen and on which position the rear seat will be exposed for use. The panel is preferably moved between its two positions by electro-hydraulic means.

The preferred embodiment of my invention is illustrated in the accompanying drawings wherein like characters of reference designate corresponding parts and wherein.

Figure 1:
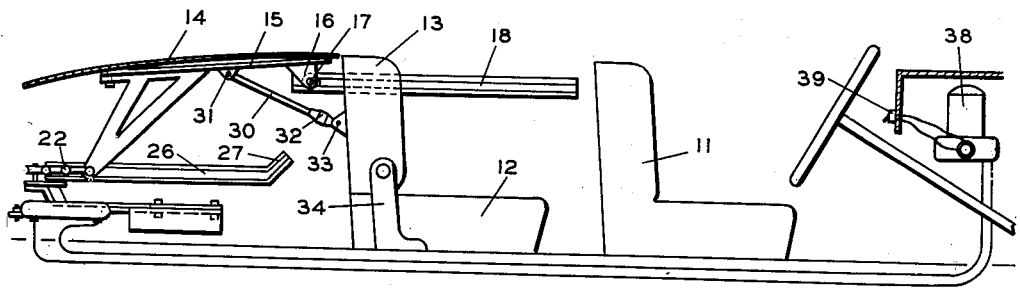
Figure 1 is a phantom vertical section view of an automobile body constructed according to my invention showing the sliding panel in its rearwardmost position within the trunk space.
Figure 2:
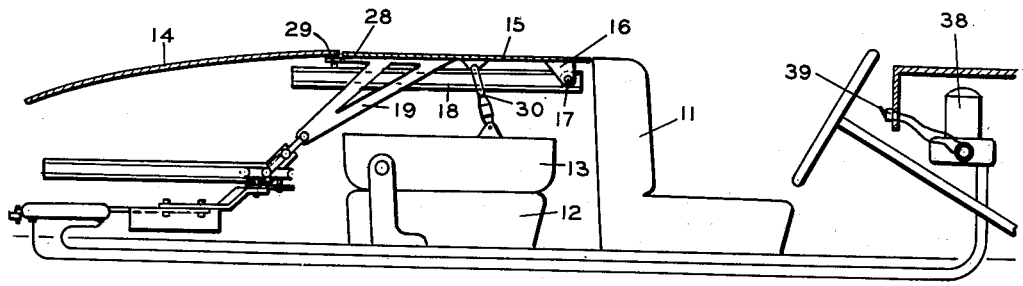
Figure 2 is a similar view showing the sliding panel in its forwardmost position covering the rear seat.
Figure 3:
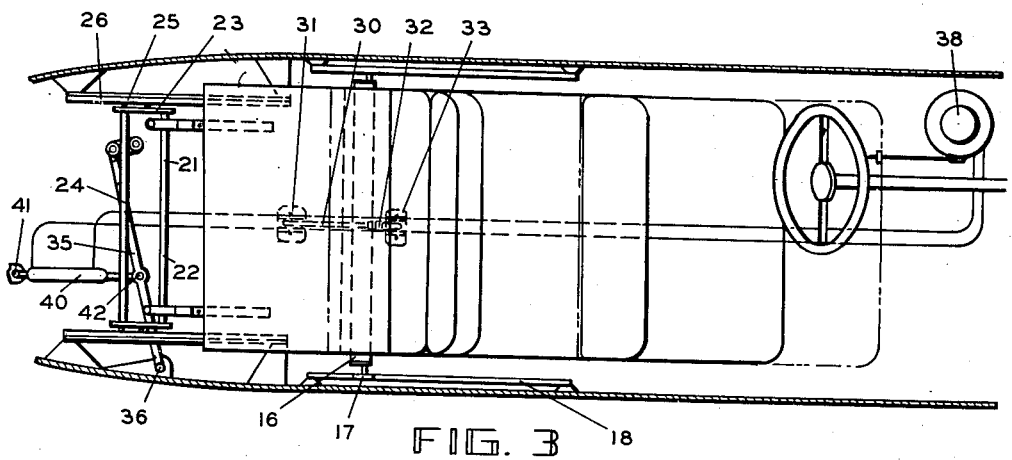
Figure 3 is a phantom horizontal sectional view showing the panel in an intermediate position.
Figure 4:
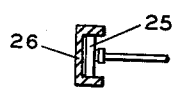
Figure 4 is a sectional view taken along line 4—4 of Figure 5 of a roller and associated track used in mounting the operating carriage of the sliding panel.

With reference to the drawings, in Figures 1, 2 and 3 I have illustrated schematically an automobile body with which my invention may be associated. This body is provided with the usual front seat 11 and a rear seat 12 which is immediately behind the seat 11. Sweeping rearwardly from the upper edge of the back 13 of the seat 12 is the rear deck 14 of the body. The body so far described and illustrated is for example only and it should be understood that my invention is not limited to this particular type of body.

When the rear seat of the car is to be used, my sliding panel or lid 15 will be in the position shown in Figure 1 where the space occupied by the rear seat 12 will be completely uncovered and the panel will be beneath the deck 14 behind the back 13 of the seat 12. When the rear seat is not to be used, the panel 15 will be moved into covering relationship to the rear seat as shown in Figure 2, being flush with the deck 14 and forming a continuation thereof.

Figure 5:
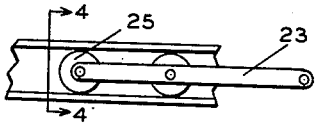
Figure 5 is a side view of the roller arrangement shown in Figure 4.
Figure 6:
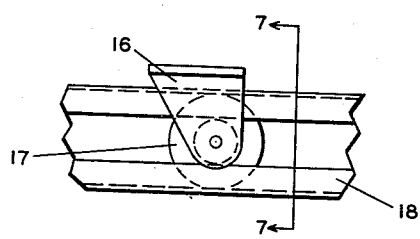
Figure 6 is a side elevational view of another roller and track arrangement used in mounting the sliding panel.
Figure 7:
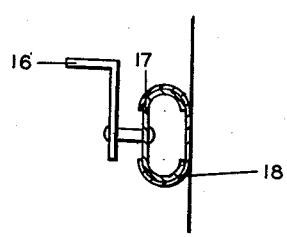
Figure 7 is a sectional view taken along line 7—7 of Figure 6.
Figure 8:
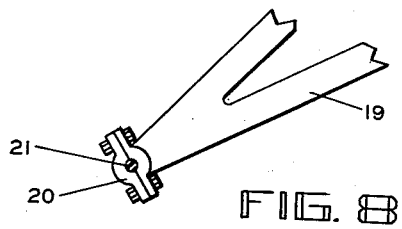
Figure 8 is a side view of a brace used in mounting the sliding panel.

The lid or panel 15 is in the form of a plate of metal of substantially the same thickness as the metal of the deck 14. For sliding the lid or panel 15, it is provided at its forward end with a pair of depending brackets 16 shown in Figures 1 to 3 and illustrated in detail in Figures 6 and 7. These brackets may be welded or otherwise secured to the lower surface of the panel 15 adjacent its forward edge and each carries a roller 17 on its lower end. The rollers 17 operate in channel tracks 18 which are welded or otherwise secured to the sides of the car body. These tracks and cooperating rollers are so shaped as to aid in preventing side movement or rattling of the panel 15. The rear of the panel 15 is provided with a pair of rearwardly and downwardly extending braces 19, one of which is shown more in detail in Figure 8. As shown best in Figures 1 and 2, each brace 19 has its upper end secured to the lower surface of the panel 15 adjacent the rear edge thereof. The lower ends of these braces 19 are provided with pivot clamp members 20 which rotatably receive a transversely extending rod 21 which is shown best in Figure 3. This rod 21 is part of a movable carriage 22 and has its ends rigidly secured to longitudinally extending roller-carrying side bars 23. Rearwardly of the rod 21 is a second rod 24 of the carriage 22 which also has its ends rigidly secured to the bars 23. Each of the bars 23 carries a pair of rollers 25, (Figure 5) one of the rollers being spaced ahead of the other. These rollers 25 operate in tracks 26 which are welded or otherwise secured to the side of the car body at a level below the level of the tracks 18 and rearwardly of such tracks. The forward end of each of the tracks 26 is provided with an upwardly and forwardly directed cam-section 27.

When the rear seat 12 is uncovered, the carriage 22 will be in its rearwardmost position as shown in Figure 1, with the rollers 25 thereof adjacent the rear ends of the tracks 26. The rollers 17, carried at the forward edge of the panel 15, will be at the rear ends of the tracks 18. To cause the panel 15 to move to the position shown in Figure 2 in covering relationship to the rear seat 12, the carriage 22 will be moved forwardly along the tracks 26. This will cause the forwardmost rollers 25 to eventually reach the cam-track sections 27 and as the forwardmost rollers 25 thereof enter the sections 27, the rear edge of the panel 18 will be swung flush with the deck portion. The tracks 18 extend from beneath deck 14 to a point directly behind front (seat 11) in line upwardly slightly so that as panel 15 slides forwardly from under deck 14 its forward edge gradually rises. Then as forwardmost rollers 25 reach cam-sections 27 its rear edge is suddenly lifted to the level of deck 14. The rearwardmost rollers 25 will eventually occupy a position at the junction of the track sections 27 with the main track portions, as shown in Figure 2. Each brace 19 is provided with a rearwardly extending finger 28 which carries an adjustable stop screw 29. When the panel 15 is in the position shown in Figure 2, the stop screws 29 will contact the lower surface of the deck 14 so that the rear edge of panel 15 will be exactly flush with the forward edge of the deck 14. When the carriage is moved rearwardly the forwardmost rollers 25 will quickly move out of cam-sections 27 and will cause the rear edge of panel 15 to drop so it will quickly clear the forward edge of deck 14.

In order to swing the back 13 of the rear seat 12 forwardly when the panel 15 moves forwardly a connecting rod 30 is pivoted to the lower surface of the panel 15 substantially at the midpoint between its front and rear edges. The forward end of the rod 30 is connected by an adjustable sleeve connection 32 and pivot 33 to the rear side of the seat back 13 at a point spaced below its upper edge. The back 13 is hinged to the seat portion by means of a stabilizing hinge structure 34. It will be apparent that as the panel 15 moves forwardly, the seat back 13 will be swung forwardly and downwardly into contact with the seat portion as shown in Figure 2 although in this figure the rod 30 and braces 19 are shown not to scale. On the other hand, when the panel 15 is moved rearwardly, the rod 30 will serve to pull the seat back 13 upwardly and rearwardly to the position shown in Figure 1.

Figures 9, 10:
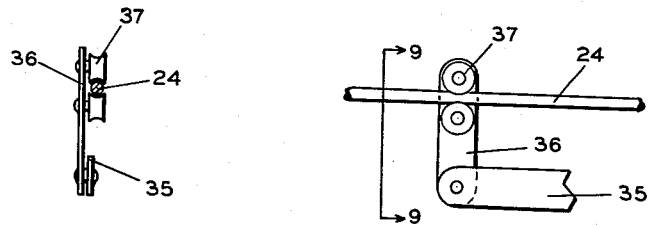
Figure 9 is a sectional view taken along line 9—9 of Figure 10 showing another roller arrangement used in connection with the movable carriage of the operating mechanism of the panel.
Figure 10 is a side elevational view of the structure of Figure 9.

For moving the carriage 23 between its two positions, I provide the transversely extending lever 35 which is swingable in a horizontal plane, being pivoted to one side of the body at 36. The free end of this lever 35, as shown best in Figures 3, 9, and 10, is pivoted to a link 36. This link 36 carries a pair of channel rollers 37 which embrace the rod 24 of the carriage 23. It will be apparent that swinging movement of the lever 35 will move the carriage 23 forwardly or rearwardly. Furthermore, as the forward rollers 25 move into the cam-track sections 27 and the carriage 23 tilts upwardly, the rollers 37 will rock about the rod 24 and will not interfere with this tilting movement or the reverse tilting as the carriage starts its rearward movement.

It is preferred to move the lever 35 by electrohydraulic means. This means may be the usual switch and pump unit 38 which is commonly provided in automobiles for operating the window mechanism and other mechanisms thereof. This unit 38 may be actuated by a switch lever 39 on the dash. The unit 38 will control a hydraulic jack 40. The rear end of this jack 40 is pivoted at 41 to the car body and its forward end is pivoted at 42 to the lever 35 intermediate its ends.

It will be apparent from the above description that I have provided a novel arrangement whereby the rear seat of the car body can be exposed for use or can be covered to give a better appearance to the body. The arrangement can be operated from the driver's seat. The cooperating tracks and rollers will prevent both lateral and vertical movement of the panel 15. Furthermore, the rod 30 will aid in preventing vertical movement of the panel 15.

Various other advantages will be apparent.

Having thus described my invention what I claim is:

1. A convertible car body of the open type having front and rear seats with a rear deck behind the rear seat and including a panel mounted on the body for movement between a position under the rear deck behind the rear seat and a forward position over the space occupied by the rear seat, said rear seat being provided with a back portion which is hinged to the seat for swinging movement from its upstanding position to a lower forward position over the seat portion and the back being connected to the panel by connecting rods which are pivoted to the panel and to the back so that as the panel is moved forwardly the seat back will be swinging out of the path of movement of the panel and as the panel is moved rearwardly the seat back will be moved again to its normal upstanding position, means for mounting the panel for the indicated movement and for supporting it in a forward position flush with the rear deck so that it will be a continuation thereof, said means comprising tracks on the car body and rollers carried by the panel which cooperate with the tracks, said tracks including a pair of upper tracks which extend from beneath the rear deck forwardly along the space occupied by the rear seat and a pair of lower tracks which are disposed at a lower level beneath the rear deck, said rollers including rollers carried by the forward edge of the panel and operating in the upper tracks and downwardly and rearwardly extending braces on the rear edge of the panel and connected to rollers which operate on the lower tracks, said last-named rollers being mounted on a carriage which moves along the lower tracks, means for moving the panel between its two positions and connected to said carriage, said carriage having forward and rearward rollers spaced from each other, said lower tracks being provided with upwardly and forwardly directed cam-sections at their forward ends into which the forward rollers of the carriage will move as the panel nears its forwardmost position, said carriage being pivotally connected to the lower end of said braces, said moving means comprising a lever pivoted to the car body for forward and rearward movement in a horizontal plane, said lever being connected to the carriage for relative movement transversely thereof, and the carriage being connected to the lever for relative tilting movement.

2. A car body according to claim 1 wherein the braces extend below the rear deck when the panel is in its forwardmost position, and fingers connected to the braces and carrying adjustable screws which engage the lower surface of the deck at its forward edge.

3. A convertible car body according to claim 2 wherein a jack is provided for moving said lever, said jack being pivoted to the car body and to the lever.

4. A convertible car body according to claim 3 including electro-hydraulic means operable from the dash for controlling said jack.

5. A convertible car body of the open type having front and rear seats with a rear deck behind the rear seat and including a movable panel, said seat including a movable back portion, means for supporting the panel for movement between a position under the rear deck behind the rear seat and a forward position over the space occupied by the rear seat, means for moving the panel between such positions, and a connection between said back portion and the panel so that as the panel is moved forwardly the seat back will be swung out of the path of movement of the panel and as the panel is moved rearwardly the seat back will be moved again to its normal upstanding position.

6. A convertible car body according to claim 5 wherein the seat back is hinged to the seat for swinging movement from its upstanding position to a lower forward position over the seat portion and said connecting means comprises a connecting rod which is pivoted to the panel and to the back.

7. A convertible car body according to claim 6 wherein said means for supporting the panel for movement will support it in a forward position flush with the rear deck so that it will be a continuation thereof.

8. A convertible car body according to claim 7 wherein the supporting means for the panel includes tracks on the car body and rollers carried by the panel which cooperate with the tracks.

9. A convertible car body according to claim 8 wherein the tracks include a pair of upper tracks which extend from beneath the rear deck forwardly along the space occupied by the rear seat and a pair of lower tracks which are disposed at a lower level beneath the rear deck, rollers carried by the forward edge of the panel and operating in the upper tracks, and downwardly and rearwardly extending braces on the rear edge of the panel and connected to rollers which operate in the lower tracks.

10. A convertible car body according to claim 9 wherein the last-named rollers are mounted on a carriage which moves along the lower tracks, and wherein the means for moving the panel is connected to said carriage.

11. A convertible car body according to claim 10 wherein the carriage has forward and rearward rollers spaced from each other, said lower tracks being provided with upwardly and forwardly directed cam-sections at their forward ends into which the forwardmost rollers will move as the panel nears its forwardmost position.

12. A convertible car body according to claim 11 wherein the carriage tilts as the forwardmost rollers thereof move into said cam-sections, said carriage being pivotally connected to the lower ends of said braces.

References Cited in the file of this patent

UNITED STATES PATENTS

| Number | Name | Date |
|---|---|---|
| 1,712,562 | Jeffers | May 14, 1929 |
| 1,907,662 | Pinto | May 9, 1933 |
| 1,956,616 | Holtom | May 1, 1934 |
| 2,013,314 | Metz | Sept. 3, 1935 |
| 2,111,885 | Cambessedes | Mar. 22, 1938 |

FOREIGN PATENTS

| Number | Country | Date |
|---|---|---|
| 808,881 | France | Nov. 24, 1936 |